United States Patent [19]
Masui

[11] Patent Number: 5,339,161
[45] Date of Patent: Aug. 16, 1994

[54] CCD DRIVING IC CIRCUIT

[75] Inventor: Takayuki Masui, Nabari, Japan

[73] Assignee: Sharp Kabushiki Kaisha, Osaka, Japan

[21] Appl. No.: 864,952

[22] Filed: Apr. 7, 1992

[30] Foreign Application Priority Data

Nov. 29, 1991 [JP] Japan ................................. 3-316771

[51] Int. Cl.⁵ ............................................ H04N 5/335
[52] U.S. Cl. .................... 348/312; 348/241; 377/34
[58] Field of Search ...................... 358/213.11, 213.15, 358/209; 377/34, 44, 115, 116

[56] References Cited

U.S. PATENT DOCUMENTS 4,866,740  9/1989  Iijima .
5,191,425  3/1993  Hachiyama et al. ............ 358/213.15

FOREIGN PATENT DOCUMENTS 60-113532  6/1985  Japan ............................. H03M 1/06
61-026373  5/1986  Japan ............................. H04N 5/33.5
3-016199   1/1991  Japan ............................. H05K 9/00

OTHER PUBLICATIONS

Hachiyama et al., "New CCD Timing IC with Synchronizing Signal Generator" Proc. of 1991 ITE Ann. Conv. Jul 1991, pp. 55–56.

"New CCD Timing IC with Synchronizing Signal Generator" from the Proceedings of the 1991 ITE Annual Convention; Jul. 1991; pp. 3–10.

Porat et al., "Fast Synchronous Gray Counter" Nuclear Instruments and Methods, vol. 169, pp. 243–244 (1980).

Primary Examiner—Joseph Mancuso
Assistant Examiner—Tuan V. Ho

[57] ABSTRACT

A CCD driving IC circuit includes a timing signal generator for generating a timing signal, and a synchronizing signal generator for generating a TV reference signal. The timing signal generator and the synchronizing signal generator are formed on the same chip, and the synchronizing signal generator includes a plurality of frequency dividers configured in multiple rows with each having a respective output. The frequency dividers being interconnected such that a same number of outputs change state during a change in state of an input clock signal.

10 Claims, 4 Drawing Sheets

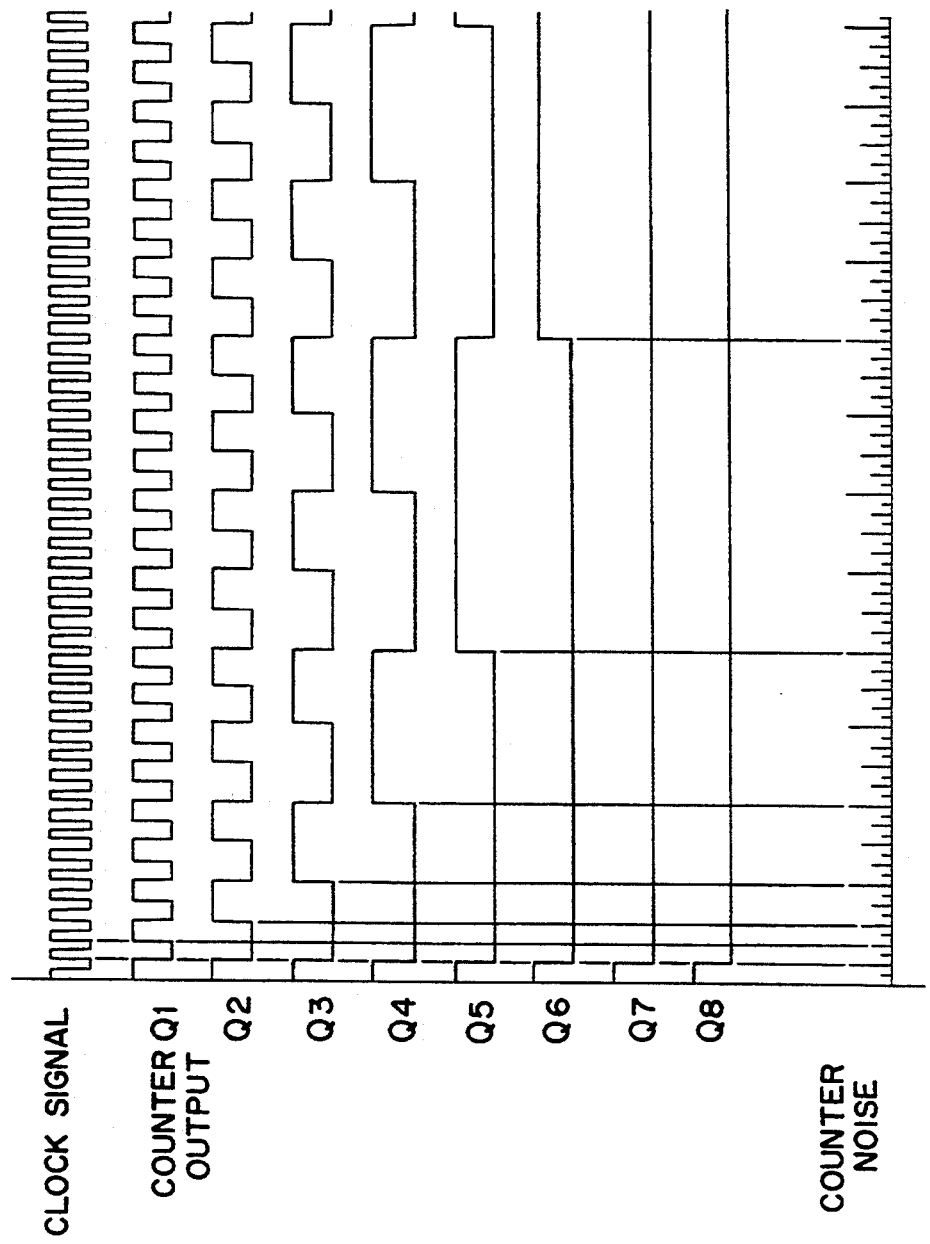

CCD DRIVING IC CIRCUIT

BACKGROUND OF THE INVENTION

1. Field of the Invention

The present invention relates to a charge coupled device (CCD) driving circuit. More particularly, the present invention relates to a CCD driving circuit which includes a timing signal generator for generating timing signals used to drive a CCD image sensor, and a synchronizing signal generator integrated on the same chip as the timing signal generator for generating a TV reference signal.

2. Description of the Related Art

It is known that a video camera requires a timing signal generator for generating timing signals used to drive a CCD image sensor. Furthermore, the video camera requires a synchronizing signal generator for generating a TV reference signal. These generators are used to produce timing signals and TV reference signals by dividing clock signals which are input. In order to minimize the size and production costs of the camera, the timing signal generator and the synchronizing signal generator are integrated on the same chip or substrate.

Referring initially to FIG. 3, a known synchronizing signal generator for a CCD driving circuit is shown. The synchronizing signal generator is equipped with a counter that includes D-type flip-flops 31 to 38 disposed in multiple rows with each flip-flop corresponding to a respective row. The $\overline{Q}$ output of each flip-flop 31 to 38 is connected to its own D-input. In this manner, each D-type flip-flop 31 to 38 forms a frequency divider. The D-type flip-flop 31 in the 1st row receives a clock signal at its CK input, and the D-type flip-flops 32 to 38 in the respective subsequent rows receive the Q output of the immediately preceding D-type flip-flop 31 to 37 at its $\overline{CK}$ input. As a result, counter outputs $Q_1$ to $Q_8$ become half frequency pulses obtained by successively dividing the clock signals provided to each flip-flop from the Q output of the preceding D-type flip-flop. By combining the counter outputs $Q_1$ to $Q_8$, a desired TV reference signal is generated as is known.

The timing signal generator (not shown) for the CCD driving circuit is equipped with a counter providing the same type of frequency division. By combining outputs from such a counter, the desired timing signals are generated.

According to the known arrangement described above, the counter in the timing signal generator is kept inoperative while the CCD image sensor is in operation. The counter in the timing signal generator is operative only during a blanking period of time, so that a video signal is protected against noise that may be caused by the operation of the counter.

However, the synchronizing signal generator must be operated during the imaging operation so as to produce TV reference signals. Accordingly, the operation of the counter in the known synchronizing signal generator changes the output logic levels of each D-type flip-flop 31 to 38. As a result, a pulsating current is produced which causes counter noise to occur to the detriment of the video signal. More specifically, as is shown in FIG. 4, when the logic level of one of the counter outputs $Q_1$ to $Q_8$ in a particular row is changed, the logic levels of one or more of the other counter outputs $Q_1$ to $Q_8$ in the subsequent rows are simultaneously changed. Consequently, pulsating currents generated by such logic level changes overlap one after another, and the resulting counter noise contains components of different divided frequencies. Therefore, even if a clock signal occurs outside the image forming area, a counter noise having a lower frequency component will be mixed in the video signal of the CCD image sensor during the imaging operation due to the timing signal generator which is formed on the same chip. As a result, the video image is spoiled with a solid pattern having vertical strips.

In order to avoid counter noise from occurring in the video image as a result of the synchronizing signal generator, the known CCD driving circuit is configured such that the synchronizing signal generator and the timing signal generator are separated by a source bus and a GND bus. Accordingly, the IC circuit for the CCD driving circuit becomes complicated, and freedom of design is limited.

SUMMARY OF THE INVENTION

The CCD driving IC circuit of this invention, which overcomes the above-discussed and numerous other disadvantages and deficiencies of known circuits, includes a timing signal generator for generating a timing signal, a synchronizing signal generator for generating a TV reference signal, the timing signal generator and the synchronizing signal generator being formed on the same chip, the synchronizing signal generator including frequency dividers configured in multiple rows and each having a respective output, and the frequency dividers being interconnected such that a same number of outputs change state during a change in state of an input clock signal.

According to another embodiment of the present invention, a CCD driving circuit is provided which includes a timing signal generator for generating a clock signal; and a synchronizing signal generator for generating a TV reference signal, the synchronizing signal generator including means for generating a plurality of output signals whose respective logic levels change as a function of the clock signal, and wherein the logic levels of a fixed number of the output signals are changed each time the logic level of any one of the output signals is changed.

In a preferred embodiment, the fixed number of the output signals is one.

In a preferred embodiment, the plurality of output signals includes at least eight output signals.

In a preferred embodiment, the logic level of any one of the output signals is changed each time the clock signal undergoes a change in its logic level.

In a preferred embodiment, the plurality of output signals includes output signals $Q_1$ to $Q_N$ having a respective frequency equal to the $\frac{1}{2}^N$ times the frequency of the clock signal.

In a preferred embodiment, the generating means includes a plurality of frequency dividers.

In a preferred embodiment, the plurality of frequency dividers includes a flip-flop.

In a preferred embodiment, the plurality of output signals includes at least eight output signals.

In a preferred embodiment, the timing signal generator and the synchronizing signal generator are formed on a common substrate.

Thus, the invention described herein makes possible the objective of providing a CCD driving IC circuit which can be easily designed and fabricated without unfavorably affecting the video image.

BRIEF DESCRIPTION OF THE DRAWINGS

This invention may be better understood and its numerous objects and advantages will become apparent to those skilled in the art by reference to the accompanying drawings as follows:

FIG. 4 is a timing chart showing the waveform of each counter output signal in the synchronizing signal generator of FIG. 3.

DESCRIPTION OF THE PREFERRED EMBODIMENTS

Figure 1:
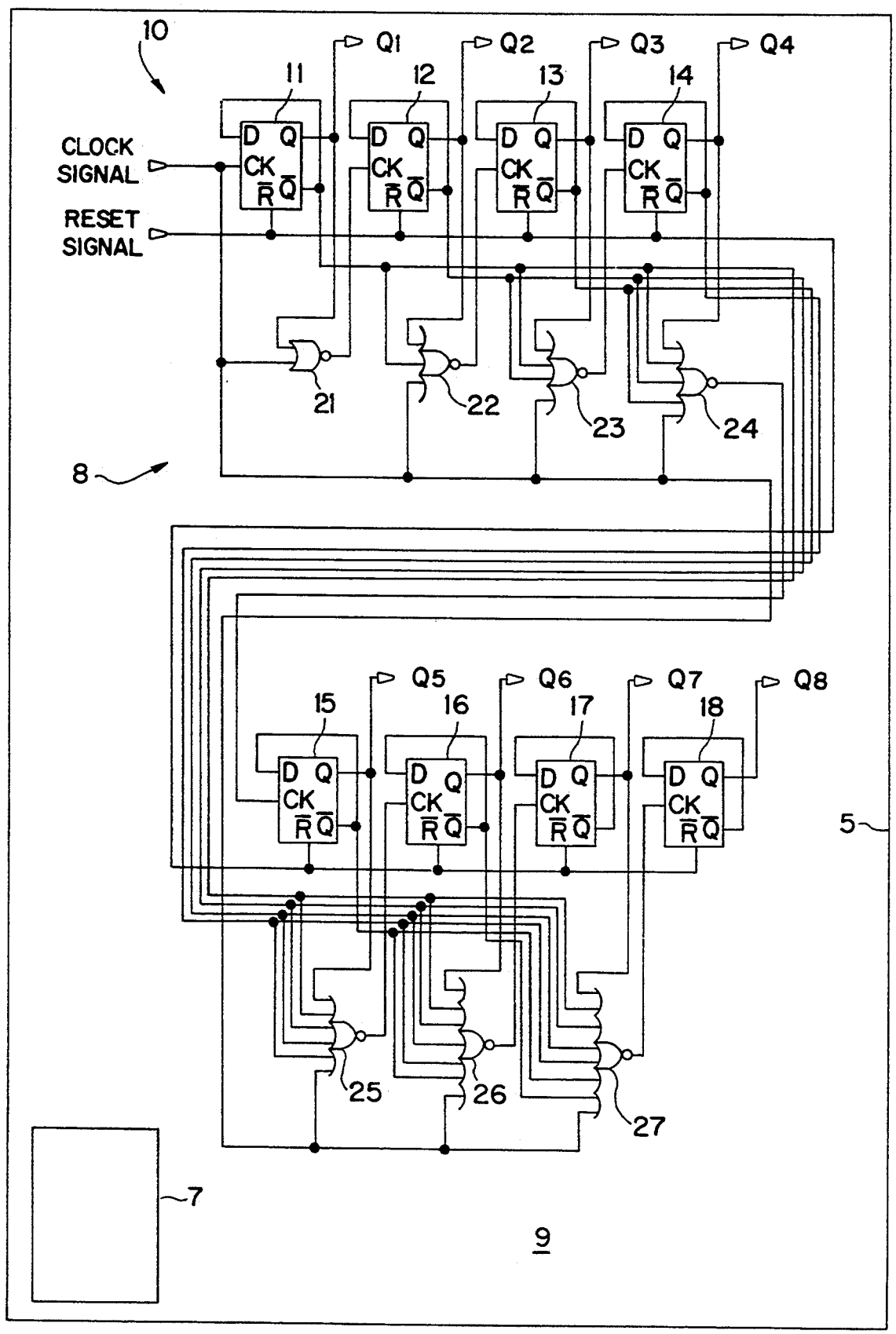
FIG. 1 is a block diagram showing a counter in a synchronous signal generator included in the CCD driving IC circuit according to an embodiment of the present invention.

Referring to FIG. 1, an exemplary CCD driving IC circuit 5 includes a timing signal generator 7 for generating a timing signal used to drive a CCD image sensor, and a synchronizing generator 8 for generating a TV reference signal. The timing signal generator 7 and the synchronizing generator 8 are formed on the same chip or substrate 9. The synchronizing signal generator 8 is equipped with a counter 10 as shown in FIG. 1.

The counter 10 includes D-type flip-flops 11 to 18 disposed in a plurality of rows, with each D-type flip-flop 11 to 18 corresponding to a respective row (in the illustrated embodiment, eight rows). The counter 10 further includes NOR circuits 21 to 27 interposed between one row and another. The $\overline{Q}$ output of each D-type flip-flop 11 to 18 is connected to its own D-input and, as a result, the high logic level and low logic level of the Q output and $\overline{Q}$ output change at each rising edge of the pulse in response to the input of a respective clock signal (CK). In this manner, a frequency divider is constituted which divides a frequency into two components. An $\overline{R}$ input coupled to each D-type flip-flop 11 to 18 receives a reset signal, and a falling edge of the reset signal restores the respective D-type flip-flops 11 to 18 to their original state.

Figure 2:
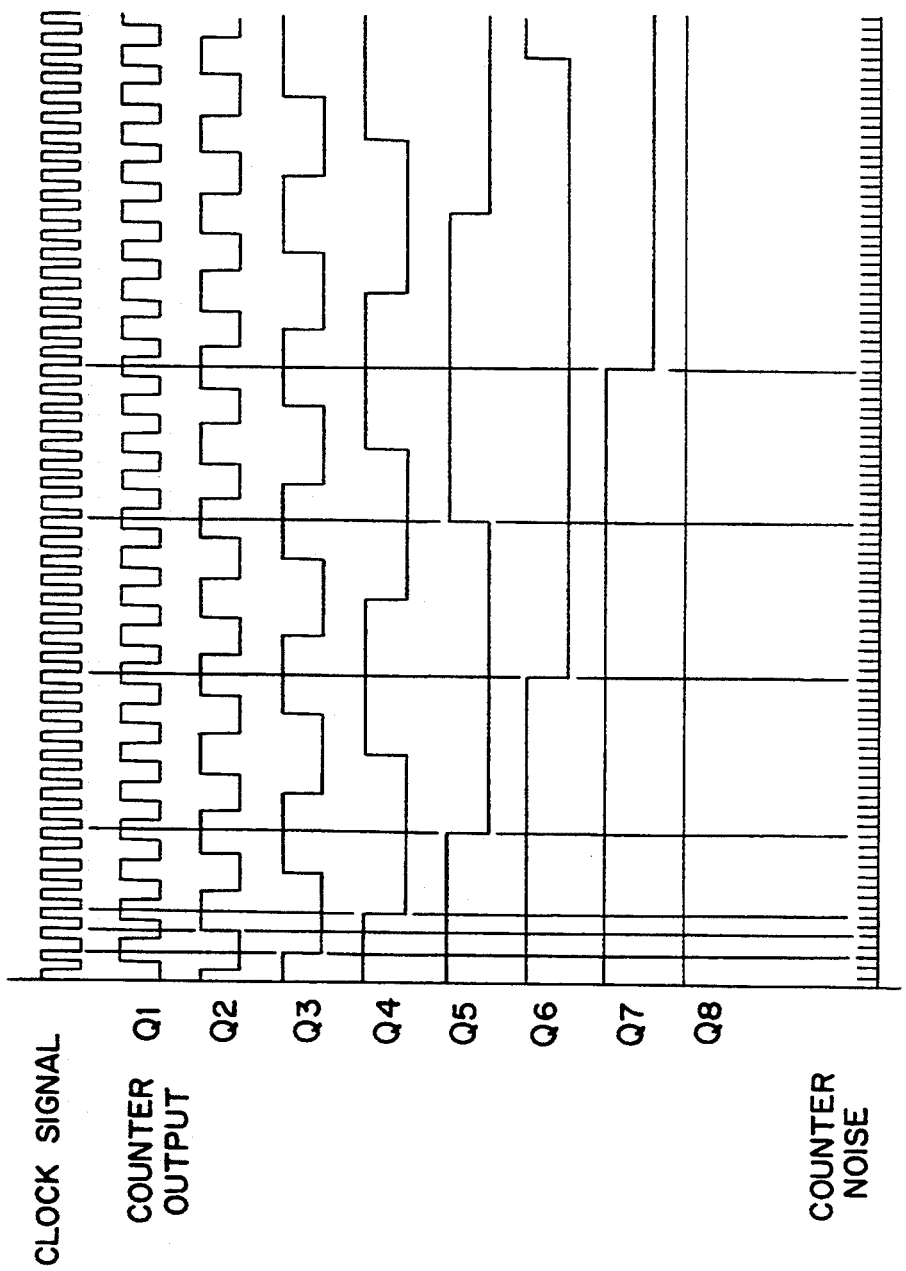
FIG. 2 is a timing chart showing the waveform of each counter output signal in the synchronizing signal generator of FIG. 1 according to an embodiment of the present invention.
Figure 3:
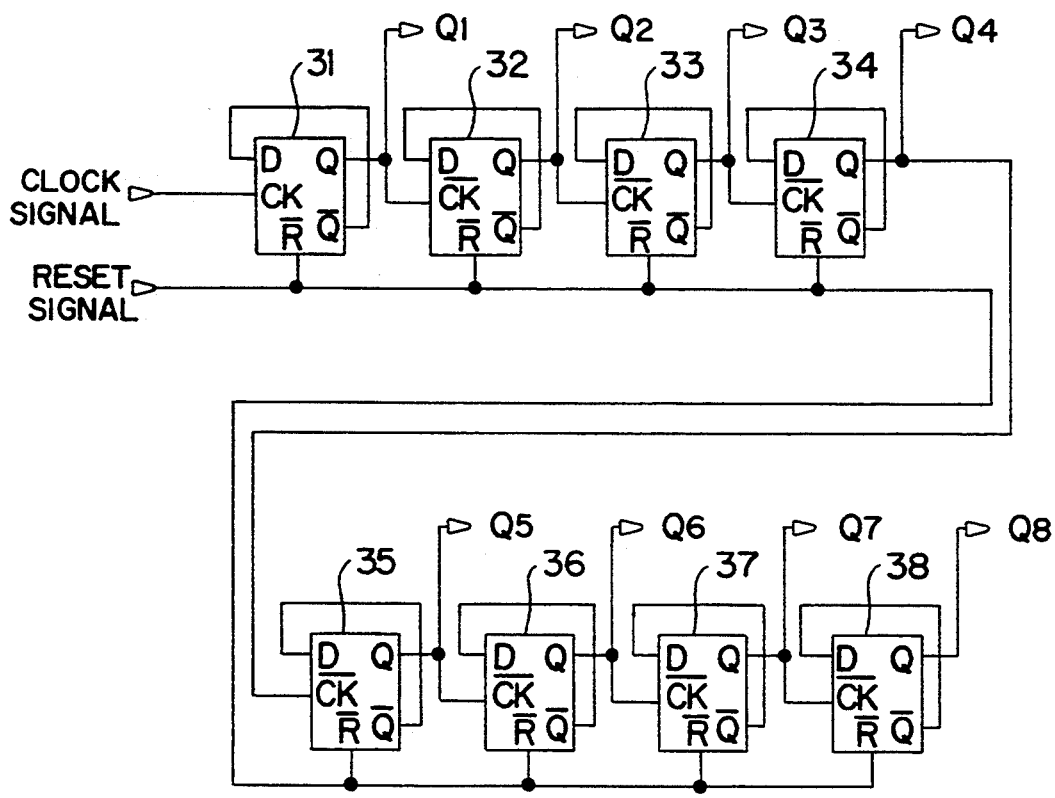
FIG. 3 is a block diagram showing a prior art synchronizing signal generator.

The flip-flop 11 in the first row receives a lo clock signal at its CK input which is provided from a clock source (not shown). A counter output $Q_1$ based on the Q output of the D-type flip-flop 11 is repeatedly subjected to changes between a high logic level and a low logic level at each rising edge of the clock signal, for thereby dividing the clock signal into a series of pulses having a frequency that is one-half that of the clock signal as is shown in FIG. 2. The clock signal in the preferred embodiment is a half wave clock provided by the timing signal generator 7.

The D-type flip-flop 12 in the second row receives as its CK input the output of the NOR circuit 21 which is disposed between the 1st and 2nd rows. The NOR circuit 21 receives as its inputs the clock signal and the counter output $Q_1$. According to this arrangement, the NOR circuit 21 generates a pulse having a high logic level only when both the clock signal and the counter output $Q_1$ are at a low logic level. A counter output $Q_2$ is based on the Q output of the D-type flip-flop 12 in the second row. The logic level of the counter output $Q_2$ changes at the rising edge of the NOR circuit 21 output at a middle point between the low and high logic levels of the counter output $Q_1$ as ms shown in FIG. 2. As a result, the counter output $Q_2$ frequency becomes equal to one-half the frequency of the counter output $Q_1$.

The D-type flip-flops 13 to 18 in the third row and the subsequent rows down to the Nth row (or final row) receive the corresponding outputs of NOR circuits 22 to 27, disposed between the (N−1)th and Nth rows, at their respective CK inputs. Each NOR circuit 22 to 27 receives the clock signal, the counter output $Q_{N-1}$, and the $\overline{Q}$ signals of the preceding D-type flip-flops 11 to 17 in the first to the (N−1)th rows. In this way, a counter output $Q_N$ based on the respective Q output of the D-type flip-flops 13 to 18 changes its output logic level at a middle point between the low and high levels of the counter outputs $Q_{N-1}$ in the (N−1)th rows as is shown in FIG. 2. As a result, the counter output $Q_N$ becomes a series of pulses having a frequency equal to one-half the frequency of the counter output $Q_{N-1}$, one-quarter the frequency of the counter output $Q_{N-2}$, etc.

In the counter 10 of the synchronizing signal generator 8 shown in FIG. 1, the high and low logic levels of the counter outputs $Q_1$ to $Q_8$ for the respective rows are advantageously designed to change at different time intervals. Every time a change occurs in the logic level of the clock signal, at least one of, and preferably the same number of, the counter outputs $Q_1$ to $Q_8$ changes its logic level at the same time; that is, the changes in the logic levels among the counter outputs $Q_1$ to $Q_8$ occur in an evenly distributed manner. In the particular embodiment shown in FIGS. 1 and 2, a single counter output $Q_1$ to $Q_8$ changes logic levels with each change in the clock signal. As a result, pulsating currents resulting from the changes in the logic levels of the counter outputs $Q_1$ to $Q_8$ are equal or substantially equal in amplitude to each other. The resulting counter noise due to the counter 10 has a relatively constant power level and has a frequency equal to twice the frequency of the clock signal as is shown in FIG. 2. Since a half wave clock is used for the clock signal, it is possible to constitute the counter noise only with signal components that exceed and are outside the image area. As a result, the image sensor is protected against unfavorable influences by the timing signal generator.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing one or more of the features of patentable novelty that reside in the present invention, including all features that would be treated as equivalents thereof by those skilled in the art to which this invention pertains.

What is claimed is:

1. A CCD driving IC circuit comprising:
   a timing signal generator for generating a timing signal; and
   a synchronizing signal generator for generating a TV reference signal;
   said synchronizing signal generator including a plurality of frequency dividers each having a data signal input, a clock signal input, a non-inverted output and an inverted output and a plurality of logic circuits;

said timing signal generator and said synchronizing signal generator being formed on the same chip;

said frequency dividers and said logic circuits being connected alternately in series such that a first of said plurality of logic circuits receives an input clock signal and a non-inverted output from one of said plurality of frequency dividers, the remaining ones of said plurality of logic circuits being connected to another of said plurality of logic circuits and receiving an input clock signal, a non-inverted output from one of said frequency dividers and an inverted output from one or more of said frequency dividers other than said one frequency divider, the outputs of said logic circuits being applied to another one of said frequency dividers different from said one frequency divider and the one or more of said frequency dividers as a clock input and an inverted output of each of said frequency dividers being applied thereto as a data signal input;

said synchronizing signal generator including said plurality of frequency dividers configured in multiple rows with each having a respective output;

said frequency dividers being interconnected such that a same number of outputs change state during a change in state of said clock signal input;

said logic circuits activate the other one frequency divider when the active signal level of said clock input signal and the signal level of the inverted signal are the same with respect to each other.

2. A CCD driving circuit, comprising:

a timing signal generator for generating a clock signal; and a synchronizing signal generator for generating a TV reference signal, said synchronizing signal generator including generating means for receiving said clock signal and generating a plurality of output signals whose respective signal levels change as a function of the timing of changing of the signal levels of said clock signal, and wherein the signal levels of a fixed number of said output signals are changed each time the signal level of any one of said output signals is changed;

wherein said synchronizing signal generator includes a plurality of frequency dividers and a plurality of logic circuits, each of said frequency dividers having a data signal input, a clock signal input, a non-inverted output and an inverted output; and wherein said frequency dividers and said logic circuits are connected alternately in series such that a first of aid plurality of logic circuits receives an input clock signal and a non-inverted output from one of said plurality of frequency dividers, the remaining ones of said plurality of logic circuits being connected to another of said plurality of logic circuits and receiving an output clock signal, a non-inverted output from one of said frequency dividers and an inverted output from one or more of said frequency dividers other than said one frequency divider, the outputs of said logic circuits being applied to another one of said frequency dividers different to said one frequency divider and the one or more of said frequency dividers as a clock input and an inverted output of each of said frequency dividers being applied thereto as a data signal input.

3. The CCD driving circuit of claim 2, wherein said fixed number of said output signals is one.

4. The CCD driving circuit of claim 3, wherein said plurality of output signals comprise at least eight output signals.

5. The CCD driving circuit of claim 3, wherein the signal level of any one of said output signals is changed each time said clock signal undergoes a change in its signal level.

6. The CCD driving circuit of claim 2, wherein said plurality of output signals comprise output signals $Q_1$ to $Q_N$ having a respective frequency equal to the $\frac{1}{2}^N$ times the frequency of said clock signal.

7. The CCD driving circuit of claim 6, wherein said generating means comprises a plurality of frequency dividers.

8. The CCD driving circuit of claim 7, wherein each of said plurality of frequency dividers comprises a flip-flop.

9. The CCD driving circuit of claim 8, wherein said plurality of output signals comprise at least eight output signals.

10. The CCD driving circuit of claim 2, wherein said timing signal generator and said synchronizing signal generator are formed on a common substrate.

* * * * *